United States Patent
Banerjee et al.

(10) Patent No.: US 7,922,494 B2
(45) Date of Patent: Apr. 12, 2011

(54) METHOD FOR IMPROVED ADMINISTERING OF TESTS USING CUSTOMIZED USER ALERTS

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2038 days.

(21) Appl. No.: 09/941,251

(22) Filed: Aug. 28, 2001

(65) Prior Publication Data

US 2003/0044760 A1 Mar. 6, 2003

(51) Int. Cl.
*G09B 7/00* (2006.01)
(52) U.S. Cl. ......... 434/323; 434/350; 434/353; 434/362
(58) Field of Classification Search ............... 434/322, 434/323, 350, 362, 353
See application file for complete search history.

(56) References Cited

U.S. PATENT DOCUMENTS

| | | | |
|---|---|---|---|
| 3,100,352 A | | 8/1963 | Boissevain |
| 3,292,276 A * | | 12/1966 | Hansel ........................... 434/308 |
| 3,579,870 A | | 5/1971 | Bennett et al. |
| 3,922,665 A * | | 11/1975 | Curry et al. .................... 180/272 |
| 4,876,592 A | | 10/1989 | Von Kohorn |
| 4,926,255 A | | 5/1990 | Von Kohorn |
| 5,140,564 A * | | 8/1992 | Rich ............................. 368/107 |
| 5,195,033 A * | | 3/1993 | Samph et al. ................. 434/323 |
| 5,204,813 A * | | 4/1993 | Samph et al. ................. 434/362 |
| 5,437,554 A | | 8/1995 | Clark et al. |
| 5,577,919 A * | | 11/1996 | Collins et al. ................. 434/322 |
| 5,618,182 A * | | 4/1997 | Thomas .................... 434/323 X |
| 5,700,149 A * | | 12/1997 | Johnson et al. ............... 434/322 |
| 5,718,591 A | | 2/1998 | Clark et al. |
| 5,796,681 A * | | 8/1998 | Aronzo ........................... 368/10 |
| 5,823,788 A * | | 10/1998 | Lemelson et al. ............. 434/350 |
| 5,827,070 A * | | 10/1998 | Kershaw et al. .............. 434/322 |
| 5,885,087 A * | | 3/1999 | Thomas ........................ 434/323 |
| 5,915,973 A * | | 6/1999 | Hoehn-Saric et al. ........ 434/350 |
| 5,947,747 A * | | 9/1999 | Walker et al. ............. 434/354 X |

(Continued)

FOREIGN PATENT DOCUMENTS

JP 8278745 10/1996

*Primary Examiner* — Dmitry Suhol
*Assistant Examiner* — David Duffy
(74) *Attorney, Agent, or Firm* — Yee & Associates, P.C.; Jeffrey S. LaBaw

(57) ABSTRACT

An apparatus, system, and method for monitoring test question response time from a remote location are provided. More specifically, the present invention provides a mechanism by which tests may be proctored to users from a remote location as a test administration service and providing alert notifications to the users based on the amount of time that has elapsed during the test taking process as well as the amount of time remaining to take the test. With the present invention, test progress data is obtained from the user and forwarded to a proctor workstation. A proctor device may monitor the user's test progress to determine if expected progress on the test is being attained. The testing progress data may be recorded along with test input data from the user's client device for later use. Moreover, the administering of the test may be done by a third party as a test administration service to which a test developer may subscribe. Alternatively, the users of the test administration service may be billed for their individual use of the test administration service. Other features of the present invention will be described or will become apparent to those of ordinary skill in the art in view of the following detailed description of the preferred embodiments.

12 Claims, 10 Drawing Sheets

| CURRENT QUESTION |
|---|
| EXAMINEE CURRENTLY WORKING ON QUESTION 7 |
| TIME TAKEN SO FAR BY EXAMINEE IN ATTEMPTING TO ANSWER QUESTION 7 – 7:07 MINUTES |
| TIME ALLOTTED EXAMINEE TO ANSWER QUESTION 7 – 11:29 MINUTES |
| ALERT TO BE SENT TO EXAMINEE IN 4:22 MINUTES |

808

| PREVIOUS QUESTIONS | | |
|---|---|---|
| | ACTUAL | PROJECTED |
| QUESTION 1 | 5:09 MINUTES | 4:11 MINUTES |
| QUESTION 2 | 11:38 MINUTES | 9:56 MINUTES |
| QUESTION 3 | 3:36 MINUTES | 2:59 MINUTES |
| QUESTION 4 | 2:08 MINUTES | 3:11 MINUTES |
| QUESTION 5 | 5:15 MINUTES | 6:00 MINUTES |
| QUESTION 6 | 1:25 MINUTES | 2:00 MINUTES |

810

| UNATTEMPTED QUESTIONS | |
|---|---|
| | PROJECTED |
| QUESTION 8 | 3:23 MINUTES |
| QUESTION 9 | 6:50 MINUTES |
| QUESTION 10 | 5:10 MINUTES |
| QUESTION 11 | 4:19 MINUTES |
| QUESTION 12 | 2:35 MINUTES |

812

U.S. PATENT DOCUMENTS

| | | | |
|---|---|---|---|
| 5,954,510 A | 9/1999 | Merrill et al. | |
| 6,032,141 A * | 2/2000 | O'Connor et al. | 706/45 |
| 6,042,383 A | 3/2000 | Herron | |
| 6,077,085 A | 6/2000 | Parry et al. | |
| 6,086,382 A | 7/2000 | Thomas | |
| 6,093,026 A * | 7/2000 | Walker et al. | 434/322 X |
| 6,099,320 A * | 8/2000 | Papadopoulos | 434/322 |
| 6,112,049 A * | 8/2000 | Sonnenfeld | 434/350 X |
| 6,155,834 A * | 12/2000 | New, III | 434/118 X |
| 6,193,521 B1 | 2/2001 | Clark et al. | |
| 6,208,832 B1 * | 3/2001 | Remschel | 434/350 |
| 6,270,352 B1 * | 8/2001 | Ditto | 434/118 X |
| 6,301,462 B1 * | 10/2001 | Freeman et al. | 434/350 |
| 6,431,875 B1 * | 8/2002 | Elliott et al. | 434/322 X |
| 6,633,742 B1 * | 10/2003 | Turner et al. | 434/350 |
| 6,755,661 B2 * | 6/2004 | Sugimoto | 434/322 |
| 2001/0034015 A1 * | 10/2001 | Raichur et al. | 434/322 |
| 2002/0010626 A1 * | 1/2002 | Agmoni | 705/14 |
| 2002/0049815 A1 * | 4/2002 | Dattatri | 709/206 |
| 2002/0076684 A1 * | 6/2002 | Blevins et al. | 434/322 |
| 2002/0102522 A1 * | 8/2002 | Sugimoto | 434/322 |
| 2002/0160347 A1 * | 10/2002 | Wallace et al. | 434/322 |
| 2002/0172931 A1 * | 11/2002 | Greene et al. | 434/322 |

* cited by examiner

| USER 1 | | |
|---|---|---|
| TIME | QUESTION NUMBER | NOTIFICATION ALERT MESSAGE |
| t1 | 1 | TIME LEFT IS 30 SECONDS TO ANSWER QUESTION 1. QUESTION 1 TYPICALLY TAKES 60 SECONDS TO ANSWER. |
| t2 | 2 | TIME LEFT IS 60 SECONDS TO ANSWER QUESTION 2. QUESTION 2 TYPICALLY TAKES 150 SECONDS TO ANSWER. |
| tn | n | TIME LEFT IS ___ SECONDS TO ANSWER QUESTION n. QUESTION n TYPICALLY TAKES ___ SECONDS TO ANSWER. |

804

| USER 2 | | |
|---|---|---|
| TIME | QUESTION NUMBER | NOTIFICATION ALERT MESSAGE |
| t1 | 1 | TIME LEFT IS 30 SECONDS TO ANSWER QUESTION 1. QUESTION 1 TYPICALLY TAKES 85 SECONDS TO ANSWER. |
| t2 | 2 | TIME LEFT IS 60 SECONDS TO ANSWER QUESTION 2. QUESTION 2 TYPICALLY TAKES 125 SECONDS TO ANSWER. |
| tn | n | TIME LEFT IS ___ SECONDS TO ANSWER QUESTION n. QUESTION n TYPICALLY TAKES ___ SECONDS TO ANSWER. |

○
○
○

806

| USER N | | |
|---|---|---|
| TIME | QUESTION NUMBER | NOTIFICATION ALERT MESSAGE |
| t1 | 1 | TIME LEFT IS 30 SECONDS TO ANSWER QUESTION 1. QUESTION 1 TYPICALLY TAKES 50 SECONDS TO ANSWER. |
| t2 | 2 | TIME LEFT IS 60 SECONDS TO ANSWER QUESTION 2. QUESTION 2 TYPICALLY TAKES 180 SECONDS TO ANSWER. |
| tn | n | TIME LEFT IS ___ SECONDS TO ANSWER QUESTION n. QUESTION n TYPICALLY TAKES ___ SECONDS TO ANSWER. |

FIG. 8B

| CURRENT QUESTION |
|---|
| EXAMINEE CURRENTLY WORKING ON QUESTION 7<br><br>TIME TAKEN SO FAR BY EXAMINEE IN ATTEMPTING TO ANSWER QUESTION 7 – 7:07 MINUTES<br><br>TIME ALLOTTED EXAMINEE TO ANSWER QUESTION 7 – 11:29 MINUTES<br><br>ALERT TO BE SENT TO EXAMINEE IN 4:22 MINUTES |

PREVIOUS QUESTIONS

|  | ACTUAL | PROJECTED |
|---|---|---|
| QUESTION 1 | 5:09 MINUTES | 4:11 MINUTES |
| QUESTION 2 | 11:38 MINUTES | 9:56 MINUTES |
| QUESTION 3 | 3:36 MINUTES | 2:59 MINUTES |
| QUESTION 4 | 2:08 MINUTES | 3:11 MINUTES |
| QUESTION 5 | 5:15 MINUTES | 6:00 MINUTES |
| QUESTION 6 | 1:25 MINUTES | 2:00 MINUTES |

UNATTEMPTED QUESTIONS

|  | PROJECTED |
|---|---|
| QUESTION 8 | 3:23 MINUTES |
| QUESTION 9 | 6:50 MINUTES |
| QUESTION 10 | 5:10 MINUTES |
| QUESTION 11 | 4:19 MINUTES |
| QUESTION 12 | 2:35 MINUTES |

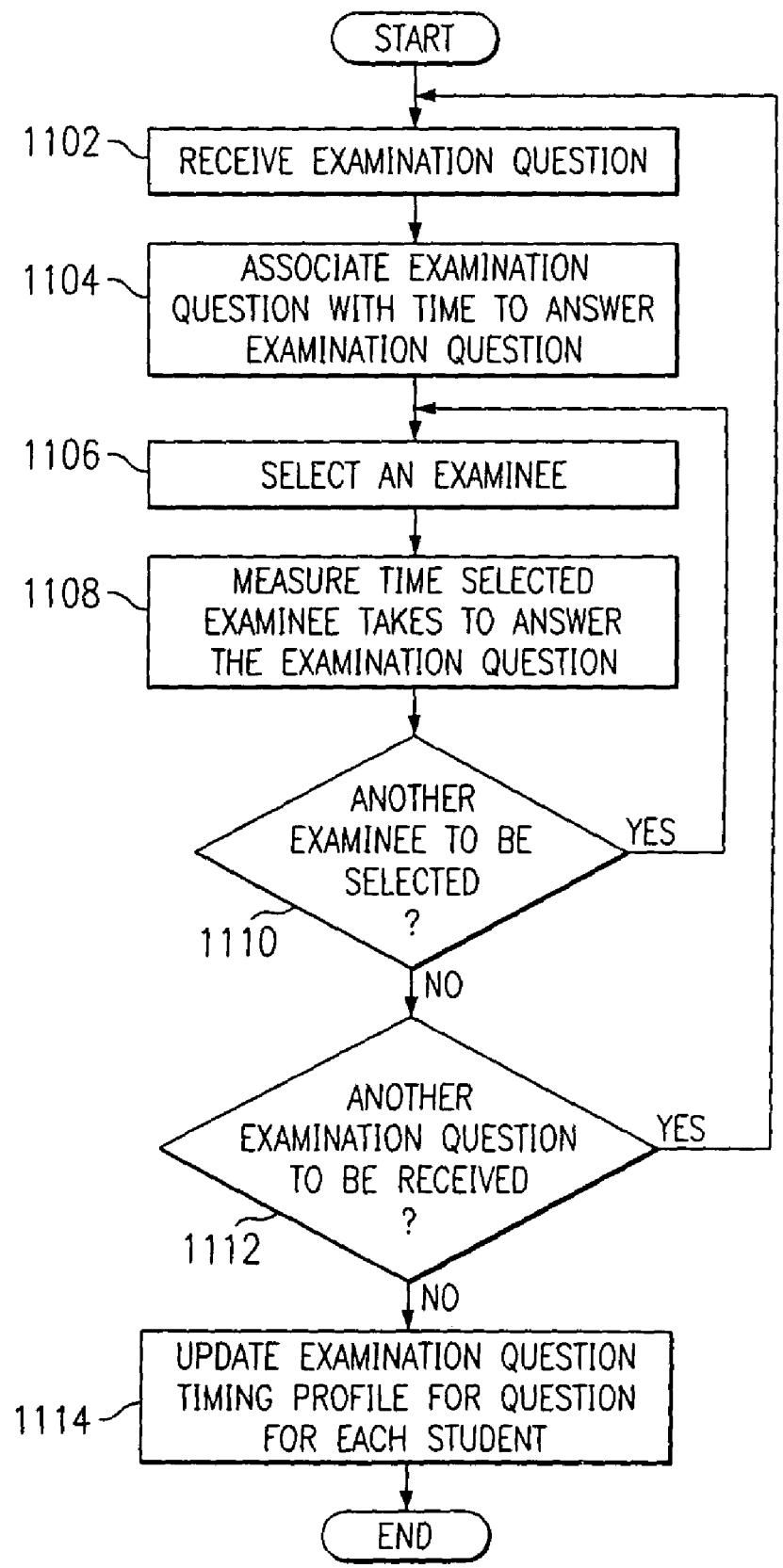

METHOD FOR IMPROVED ADMINISTERING OF TESTS USING CUSTOMIZED USER ALERTS

BACKGROUND OF THE INVENTION

1. Technical Field

The present invention is directed to an improved data processing system. More specifically, the present invention is directed to a method in a data processing system for improved administering of tests using customized user alerts.

2. Description of Related Art

On-line testing is becoming more prevalent as users of data networks realize the potential to obtain training and education via electronic means. Many colleges and universities are beginning to offer classes via computer networks, such as the Internet. With such classes, a user may download a previously recorded lecture or receive a audio/video feed of a live lecture through the user's home computer system. In this way, the student need not be physically located in the lecture location to obtain the benefit of the teacher's instruction.

In addition, some educational institutions are providing students with the ability to take tests via their home computer and a data network. With such "on-line" testing, typically the student is able to download a copy of the test, take the test, and provide his/her answers to the instructor by uploading the answers to the instructor's computer system. Thus, the student takes the test under the "honor" system. That is, there is no supervision of the student's testing environment to make sure that the student has not cheated on the test.

Furthermore, since there is no supervision of the student while taking the on-line test, the student may lose track of time. Since almost all tests in general and on-line tests in particular are timed tests, a specified amount of time is allotted to complete the test. In a supervised test taking environment, there is often a proctor which alerts the student periodically of the time that has elapsed since the start of the test as well as the time remaining to complete the test. With on-line testing this proctor is not available and, therefore, the situation may occur in which the student spends too much time on one or more questions. In such a situation, the student may, without realizing it, not be able to finish the test in the allotted amount of time. If time runs out before the student has time to complete or at least attempt to answer all the questions on the test, the student may be unduly penalized. If the student does not have time to complete the test, the student will most probably receive a failing grade and may become discouraged in attempting to further his or her educational goals.

Therefore, it would be beneficial to have an apparatus, system, and method by which a student's testing progress can be monitored from a remote location in order to make sure that the student does not spend an inordinate about of time on any one question during an examination. Moreover, it would be beneficial to have an apparatus, system, and method by which proctoring of an on-line test may be provided by a third party that is capable of proctoring the exam from a remote location and providing time alert notification to the student during the examination in an effort to aid the student in being able to complete the exam in the allotted test taking period.

SUMMARY OF THE INVENTION

The present invention provides an apparatus, system, and method for monitoring test question response time from a remote location. More specifically, the present invention provides a mechanism by which tests may be proctored to users from a remote location as a test administration service and to provide alert notifications to the users based on the amount of time that elapsed during the test taking process as well as the amount of time remaining to take the test. With the present invention, test progress data is obtained from the user and forwarded to a proctor workstation. A proctor device may monitor the user's test progress to determine if expected progress on the test is being attained. The testing progress data may be recorded along with test input data from the user's client device for later use. Moreover, the administering of the test may be done by a third party as a test administration service to which a test developer may subscribe. Alternatively, the users of the test administration service may be billed for their individual use of the test administration service. Other features of the present invention will be described or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A and 8B are exemplary examinee profiles for alerting an examinee while taking a test in accordance with the present invention;

FIG. 11 is an exemplary flowchart illustrating generating a profile database for each question of a test in accordance with the present invention.

DETAILED DESCRIPTION OF THE PREFERRED EMBODIMENT

Figure 1:
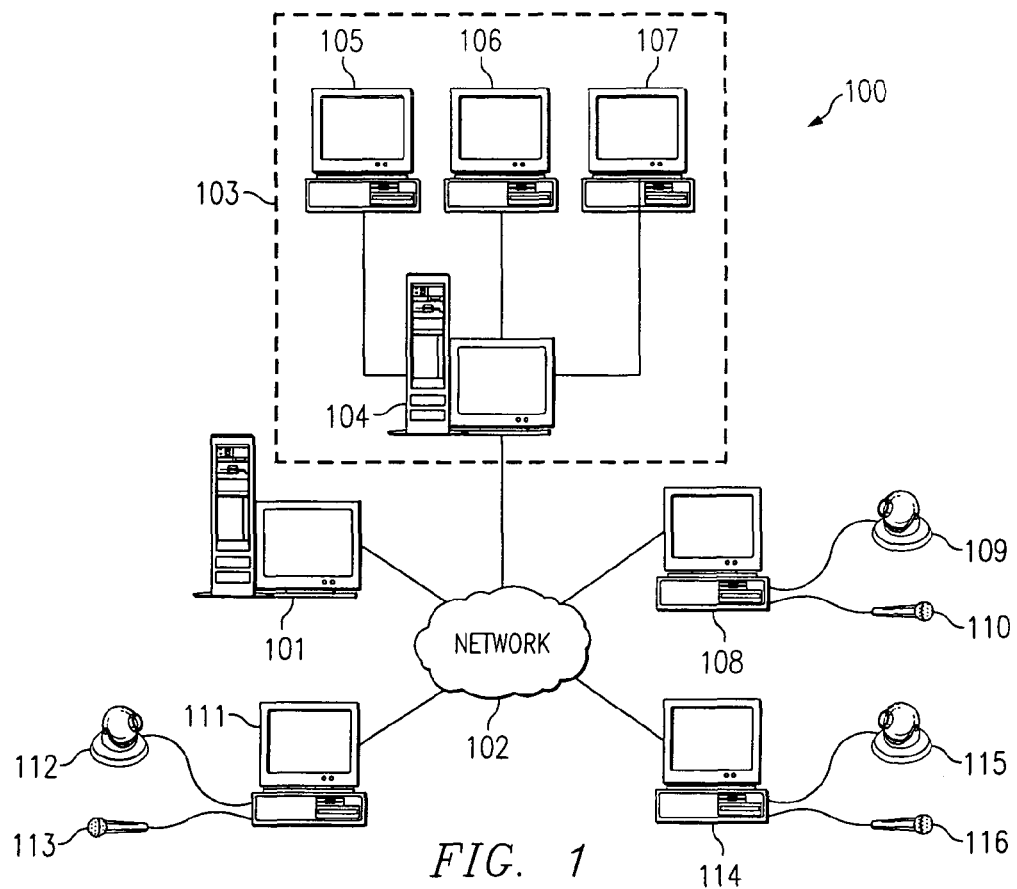
FIG. 1 is an exemplary block diagram of a network data processing system in which the present invention may be implemented.

FIG. 1 is an exemplary diagram of a distributed data processing system in accordance with the present invention. As shown in FIG. 1, the distributed data processing system 100 includes a plurality of client devices 108, 111 and 114 coupled to at least one network 102. In addition, the network 102 is coupled to a test developer system 101 and a test administration system 103. The test developer system 101 may be used to develop a test to be administered by the test administration system 103. Client devices 108, 111, and 114 may log onto the test administration system 103 so that users of the client devices 108, 111, and 114 may be administered the test developed by the test developer system 101.

The test developer system 101 and the test administration system 103 may be operated by the same or different entities. For example, the test developer system 101 may be a computer system associated with an institution interested in testing individuals. For example, the test developer system 101 may be a computer system associated with a college, university, corporation or other business entity, government agency, or the like. The test that is to be administered to the individuals may be developed using the test developer system 101 or the test developer system 101 may simply be used as a means by which the test is transferred to the test administration system 103.

The test administration system 103 may be operated by the same or a different entity from that of the test developer system 101. Thus, for example, the college, university, corporation or other business entity, government agency, or the like, that operates the test developer system 101 may also operate the test administration system 103. Alternatively, the test administration system 103 may be operated by a third party who is contracted by the operator of the test developer system 101 to administer their test.

The test administration system 103 has at least one central server 104 that is used to send and receive testing and monitoring information to and from the client devices 108, 111, and 114 and the proctor workstations 105-107. The proctor workstations 105-107 are used to monitor individuals taking tests administered by the test administration system 103. The proctor workstations 105-107 receive monitoring information from the client devices 108, 111, and 114, and are able to perform various functions in response to a proctor device's input, as will be described in more detail hereafter.

The client devices 108, 111, and 114 have one or more input devices 109, 110, 112, 113, 115, and 116 which are used to monitor the testing environment of users of the client devices 108, 111, and 114. The particular input devices shown in FIG. 1 include digital camera devices 109, 112, 115 and audio pickup device 110, 113, and 116. Digital camera devices 109, 112, and 115 may be, for example, a web camera or the like, and audio pickup devices 110, 113, and 116 may be a microphone or the like. Other types of input devices may be used without departing from the spirit and scope of the present invention.

The digital camera devices 109, 112, and 115 and audio pickup devices 110, 113, and 116 are used to input signals to the client devices 108, 111, and 114 representing the visual and auditory aspects of the testing environments of the users of the client devices 108, 111 and 114. The input signals from the digital camera devices 109, 112, and 115 and audio pickup devices 110, 113, and 116 are input to the client devices 108, 111 and 114 which then transmit the input signals as data packets to the test administration system 103, and in particular server 104. The server 104 then routes the data packets to an appropriate proctor workstation 105-107 that is assigned to monitor the particular client device, such as client device 108, 111, or 114, as will be described in more detail hereafter.

As mentioned above, the distributed data processing system 100 contains the network 102, which is the medium used to provide communications links between various devices and computers connected together within network data processing system 100. Network 102 may include connections, such as wire, wireless communication links, or fiber optic cables. Network 102 may further be comprised of more than one network of the same or different types. Thus, for example, the network 102 may include the Internet, local area networks (LANs), wide area networks (WANs), proprietary networks, wired or wireless telecommunication networks, and the like.

The client devices 108, 111, and 114 may be, for example, personal computers or network computers. Client devices 108, 111, and 114 are clients to the central server 104 of the test administration system 103. Network data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. FIG. 1 is intended only as an example, and not as an architectural limitation for the present invention.

Figure 2:
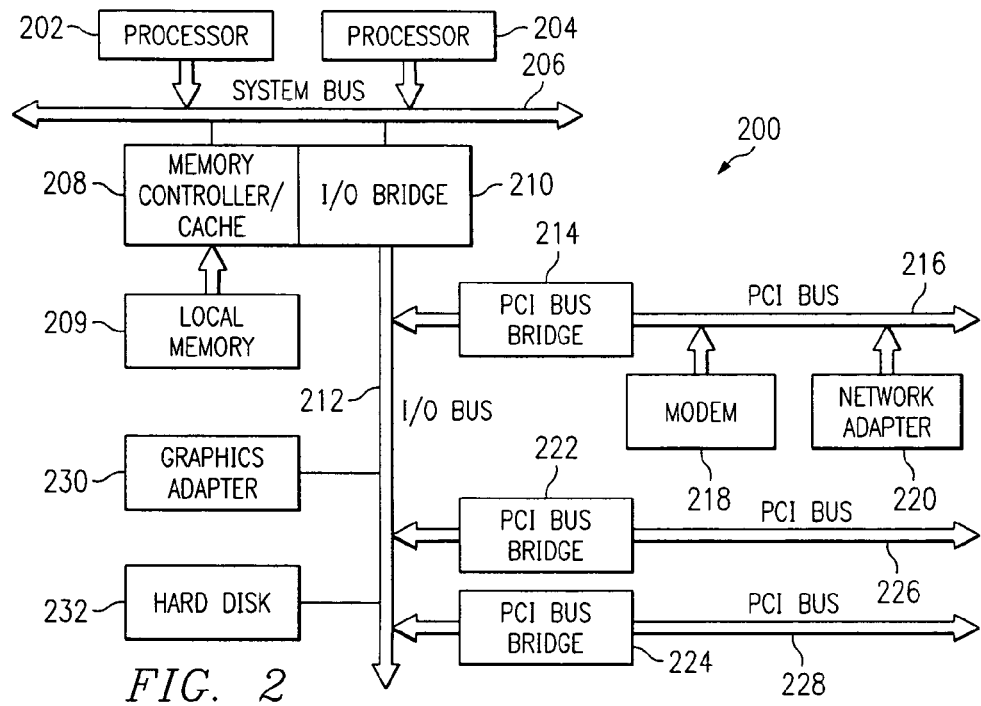
FIG. 2 is an exemplary block diagram of a server in accordance with the present invention.

FIG. 2 is an exemplary block diagram of a server in accordance with the present invention. FIG. 2 may be implemented as a server, such as central server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 111 and 114 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system.

Figure 3:
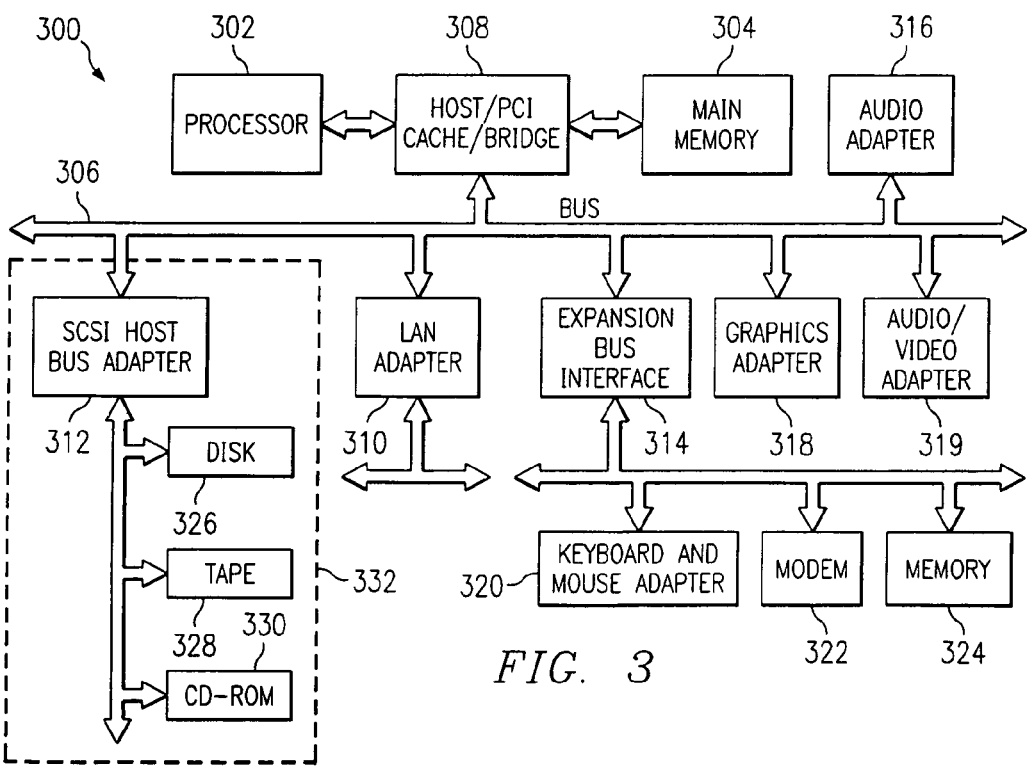
FIG. 3 is an exemplary block diagram of a client device in accordance with the present invention.

FIG. 3 is an exemplary block diagram of a client device in accordance with the present invention. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, system and computer program product for an improved administration of tests. The improved test administration process of the present invention uses customized, dynamic user alerts wherein the alerts are periodically presented to the user indicating the user's progress on the a test. This alert may be coupled with the presentation of one or more test questions on an electronic test station. The alert may notify the user of a suggested time to be spent on each individual test question as well as the time available to complete the test. The suggested amount of time for each test question may be calculated based on a perceived difficulty level of the test question.

Figure 4:
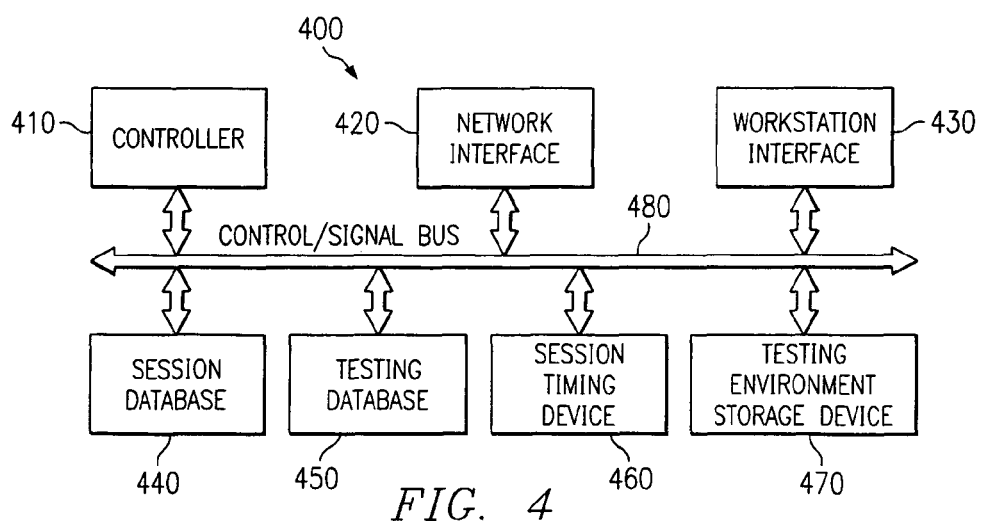
FIG. 4 is an exemplary block diagram of the primary components of the automated test proctoring system according to the present invention.

FIG. 4 is an exemplary block diagram of the primary components of the automated test proctoring system 400 according to the present invention. The primary operational components shown in FIG. 4 may be embodied as hardware components, software instructions, or a combination of hardware components and software instructions. In a preferred embodiment, the primary operational components are a combination of software instructions executed by a processor of the central server, such as processor 202 or 204, and hardware components, such as modems, network interfaces, storage devices, and the like.

As shown in FIG. 4, the primary operational components include a controller 410, a network interface 420, a workstation interface 430, a session database 440, a testing database 450, a session timing device 460, and a testing environment storage device 470. These components are in communication with one another via the control/signal bus 480. Although a bus architecture is shown in FIG. 4, the present invention is not limited to such and any architecture that facilitates the transfer of data and control signals between the components 410-470 may be used without departing from the spirit and scope of the present invention.

The controller 410 controls the overall operation of the central server and orchestrates the operation of the other components 420-470 by sending control messages to these components 420-470 via the control/signal bus 480. The network interface 420 provides a communication pathway between the central server and the at least one network 102. Data packets from client devices are received via the network interface 420 and data packet messages are sent to the client devices via this network interface 420 under instruction by the controller 410.

The workstation interface 430 provides a communication pathway between the central server and one or more proctor workstations. Monitoring information, such as the data packets received from the client devices, is sent to an appropriate proctor workstation via the workstation interface 430. In addition, instructions and data may be received from the proctor workstations via the workstation interface 430 for processing by the controller 410 and, in some cases, forwarding to the client devices via the network interface 420.

The session database 440 stores information associated with a particular testing session of a particular client device. The session database 440 stores entries for each session that is currently active. When a user of a client device, for example, first logs onto the test administration system via his client device, a session id is associated with the client device. This session id is stored in the session database 440 along with any other pertinent information needed for administration of tests to the user of the client device. Such information may include the user's name, address, student id number, test identifier, and the like.

In addition, the session database 440 includes an indicator of the proctor workstation assigned to monitor the session. The particular proctor workstation assigned is determined by the controller 410 at initiation of the session. The assignment of the proctor workstation may be performed in any reasonable manner. For example, the proctor workstation may be assigned based on relative current workloads of the various proctor workstations, a random selection, a type of test being administered during the session, or the like.

The session database 440 is also used as a means for correlating data packets received from client devices and send to client devices via the central server. Each data packet contains header information that includes the session identifier for the session to which the data packet belongs. From the session id of the data packet header, the appropriate proctor workstation or client device that is to receive the data packet may be determined. The data packet may then be routed to the proper receiving device based on this identification.

The testing database 450 stores the data representing the tests that are administered by the test administration system. The data in the testing database 450 may be used to generate tests to be administered to the various client devices. These tests may be administered in the form of applications, applets, hypertext markup language (HTML) web pages, or the like. The user of a client device may enter answers to test questions via the particular form in a manner generally known in the art. The correct answers to the various test questions may also be stored in the testing database 450 and used as a means for scoring the answers received from the user via the client device. Once the test is completed by the user, the final score for the user may be stored in a permanent memory location for use by the test developer system and/or may be provided to the user via the client device.

In addition, the testing database 450 may store an indication of the number of users to which the particular test was administered. This information may be used by a payment system to determine an amount to bill the test developer system operator for use of the test administration service of the test administration system. The session timing device 460 is used to time each of the currently active sessions being administered by the test administering system. The session timing device 460 determines a currently elapsed time of the test session, compares the currently elapsed time to a total time length of the administered test, and determines whether the test should be ended based on the comparison. In addition, the session timing device 460 may be used to time stamp data received from the client devices as well as test answer input received from the client devices.

The testing environment storage device 470 is used to record the data of a user's testing environment during a session. The data may be recorded for the entire session or a portion of the session based on input from a proctor device of a proctor workstation. As mentioned above, the data may be time stamped in order to correlate the data later. The data may further be stored in association with a session id for the particular session.

In operation, a user of client device may log onto the central server by entering, for example, a universal resource locator (URL) of the test administration system central server using a web browser application in a manner generally known in the art. The user may be presented with a list of tests available and may select a test to take using an input mechanism associated with the client device and a web page downloaded to the client device, for example. Once the user selects a test to be administered, a session is established and a session id is assigned. In addition, a proctor workstation is assigned to monitor the user's testing progress while the user takes the test. The session entry is stored in the session database 440, and the test is retrieved from the testing database 450. The test is then downloaded to the user's client device via the network interface 420. The session timing device 460 is then initiated for the session and is used to time the test as well as provide time stamp information for answer input data received from the client device.

Input to the client device is forwarded to the central server and received by the controller 410 via the network interface 420. The data may then be forwarded to the proctor workstation via the workstation interface 430 and may be stored in the testing environment storage device 470. Routing of the data as well as storing of this data in the testing environment storage device 470 may be based on a comparison of the header information for the data to session information stored in the session database 440.

A proctor device may monitor the timing data via the proctor workstation and may be able to input instructions and messages via the proctor workstation. For example, the proctor device may input instructions to end a session, send an instant text message to the client device, and may select which sessions the proctor device wants to monitor, as will be described in greater detail hereafter. In addition, the proctor device may receive instant text messages from the user of the client device via the proctor workstation.

Once the test is completed, the user's score for the test may be permanently stored for use by the test developer system and may also be provided to the user for his/her own edification. Once the testing session terminates, the session entry in the session database 440 may be deleted.

As mentioned above, the testing database 450 may also store information pertaining to the number of users that have taken the test. This information may be used by the controller 410 to generate a bill for the test developer system operator. Thus, in this way, the test developer system operator may be billed for the actual number of users that used the test administration services of the test administration system. Alternatively, the controller 410 may generate bills for each of the users based on information received from the users during an initial registration procedure as is generally known in the art. The bills generated by the controller 410 may be provided to the bill recipients via any known manner, including regular mail, electronic mail, or other electronic transmission means.

As stated above, the present invention provides a mechanism by which a test may be administered and a testing progress may be monitored from a remote location. In addition, the present invention provides a mechanism by which a third party may be contracted to administer tests to client devices for a fee. The present invention allows a proctor device to monitor a plurality of test takers from a single workstation. A workstation interface for performing these monitoring tasks is described herein below.

Figure 5:
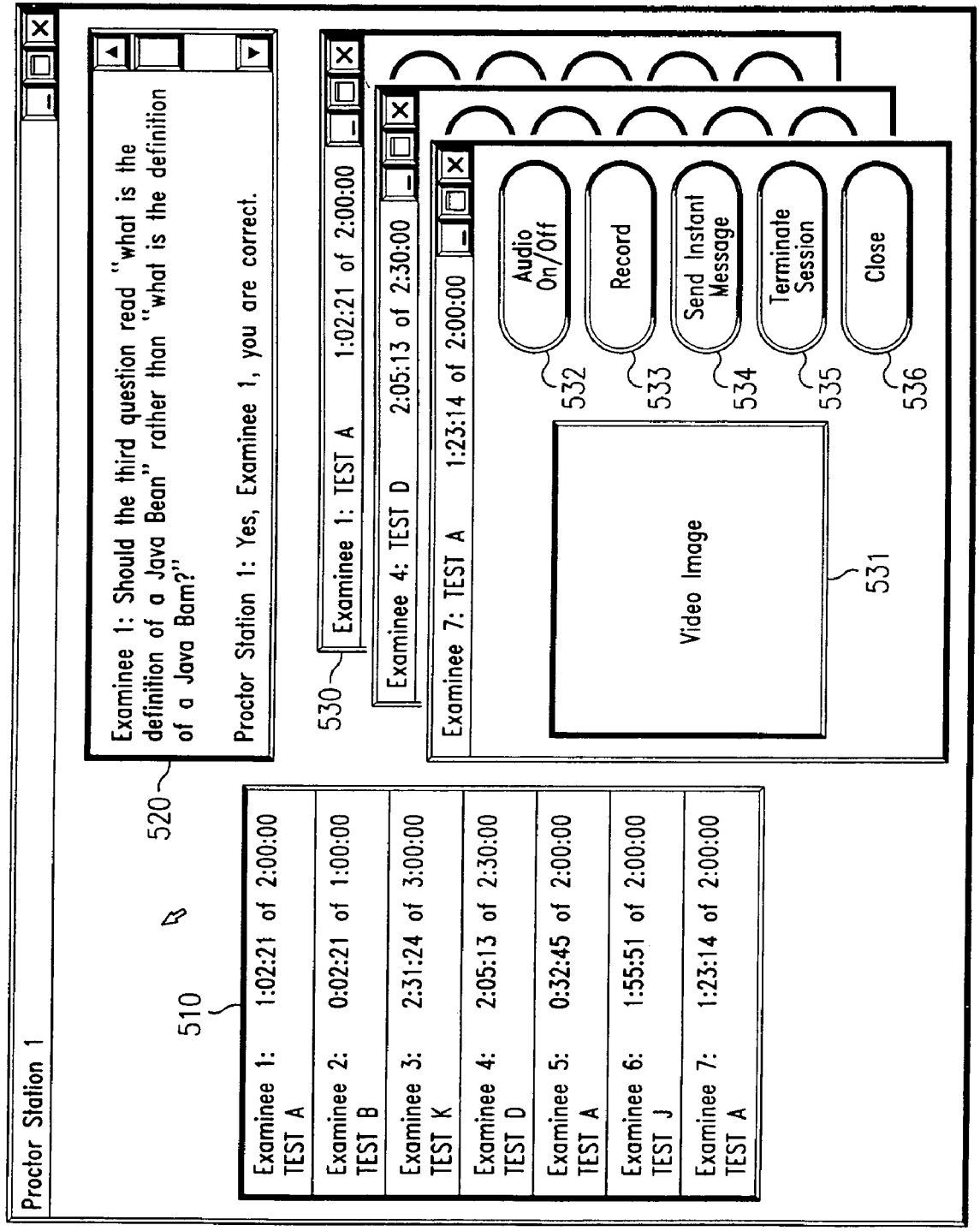
FIG. 5 is an example screen of a test proctor workstation in accordance with the present invention.

FIG. 5 is an exemplary diagram illustrating a workstation interface in accordance with one exemplary embodiment of the present invention. As shown in FIG. 5, the workstation interface 500 includes a listing 510 of currently active sessions, an instant text message box 520, and one or more windows 530 in which test timing information for a selected test session may be displayed.

The listing 510 of currently active sessions may include one or more entries for sessions that are currently active and are assigned to this particular proctor workstation. Each entry in the listing 510 may include an examinee identification, a currently elapsed time of the testing session, and an indicator of the test being administered. Other information may be displayed in addition to or in replacement of the information explicitly shown in FIG. 5 without departing from the spirit and scope of the present invention.

The proctor device may select sessions from the listing 510 which the proctor device wishes to monitor using a test environment window 530. Upon selection of a session, a test environment window 530 for the session is generated and the video and/or audio data being received from the client device is output to the proctor workstation.

The test environment window 530 includes a video image section 531 which displays the video information currently being received from the client device. This video information may be received, for example, as a data stream or the like. In addition, the audio data being streamed from a client device may be output using speakers or the like, for a currently selected environment window 530.

The environment window 530 further may include virtual buttons 532-536. These virtual buttons 532-536 may be used by a proctor to input commands to initiate functions to be performed by the controller 410. For example, the virtual button 532 may be used to cause the controller 410 to instruct that the audio data being received not be forwarded to the proctor workstation. The virtual button 533 may be used to instruct the controller 410 to start recording of video and audio data. The virtual button 534 may be used to open a text box for sending an instant message to the user of the client device. The virtual button 535 may be used to terminate a testing session and the virtual button 536 may be used to close an environment window.

The instant message text box 520 is used to display instant messages received from a client device and instant messages sent to a client device. In this way, the proctor may review a text conversation being conducted between the proctor and the user. One instant message text box 520 may be used for all client devices and users with designations being displayed before each message or separate instant message text boxes 520 may be generated for each session.

Figure 6:
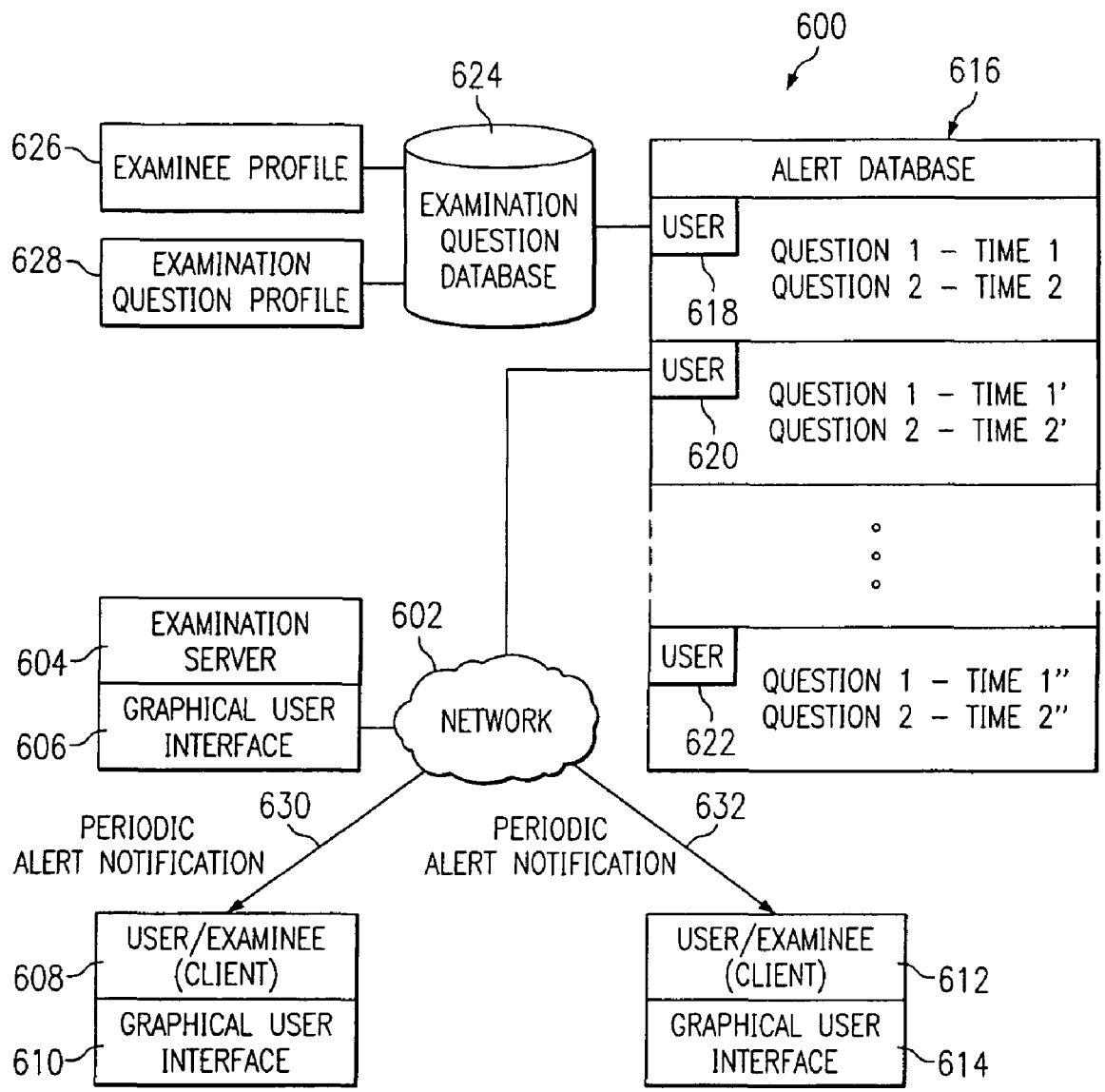
FIG. 6 is an exemplary block diagram for a testing alert notification system in accordance with the present invention.

FIG. 6 is an exemplary block diagram for a testing alert notification system in accordance with the present invention. As shown in FIG. 6, network 602, which may, for example, be similar to network 102 in FIG. 1, is connected to examination server 604, alert database 616, user/examinee 608 and user/examinee 612. Examination server 604 contains graphical user interface 606, which may, for example, be similar to workstation 500 in FIG. 5. User/examinee 608 contains graphical user interface 610 and user/examinee contains graphical user interface 614. With the use of graphical user interface 606 a proctor may, for example, monitor the time taken by a particular user to answer a question, send an instant text message to a user alerting the user of time remaining to answer a particular question, send an instant text message to a user indicating a typical time to answer a particular test question, and the like. With the use of graphical user interface, a proctor located at examination server may monitor the progress of either user/examinee 608 and/or user examinee 612 while taking the test. If the proctor located at examination server 604 determines that a user at user/examinee 608 has spent too long of a time in answering a question, the proctor may initiate periodic alert notification 630 to user/examinee 608 from examination server 604. Furthermore, if the proctor located at examination server 604 determines that a user at user/examinee 612 has spent too long in answering a question, the proctor may initiate periodic alert notification 632 to user examinee 612 from examination server 604.

In addition, with the use of graphical user interface 606 a proctor located at examination server 604 may issue a warning to the user if a question has not been answered in a predetermined amount of time. The warning may consist of time remaining to answer the question and/or an indication of how long it typically takes to answer the question.

User/examinee 608 and/or user/examinee 612 may answer test questions using graphical user interface 610 and graphical user interface 614, respectively. In addition, graphical user interface 610 and graphical user interface 614 may be used to respond to a proctor located at examination server 604.

Alert database 616 may contain information about users currently taking a test. In this example, user 618, user 620 and user 622 are currently taking a test, which is being monitored by a proctor located at examination server 604. Associated with each user, for example user 618, may be data specifying time periods in which a particular question is expected to be answered. These time periods may be the same for each user currently taking the test and included in alert database 616 or these time periods may be customized for each user based on, for example, historical data regarding average times to answer a particular question, customized data for a particular user regarding an expected time to answer a particular question, and the like. Alert database 616 may retrieve data on a specific question from examination question database 624 and may transmit data for the time recently taken by a particular user for a specific question to examination question database 624.

Also stored in examination question database 624 is examinee profile 626 and examination question profile 628. Examinee profile 626 may contain data about a particular user, such as, for example, identification of the user, past test results, past times required for the user on a question for a particular difficulty level, and the like. Examination question profile 628 may contain data about past questions encountered by a specific user.

Figure 7:
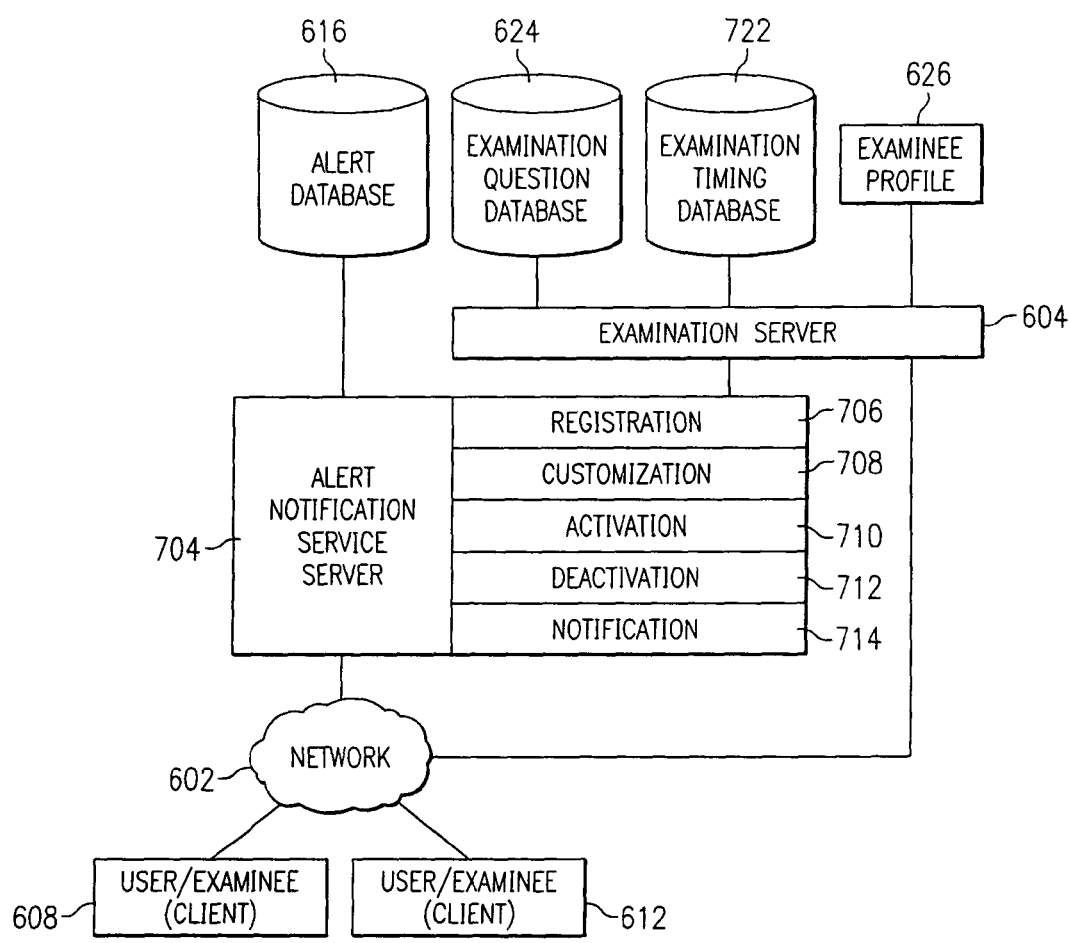
FIG. 7 is an exemplary block diagram for a testing alert notification system in accordance with the present invention.

FIG. 7 is an exemplary block diagram for a testing alert notification system at an editor in accordance with the present invention. In this example, network 602, examination server 604, user/examinee 608, user/examinee 612, alert database 616, examination question database 624, and examinee profile 626 are the same as shown in FIG. 6. However, as shown in FIG. 7, alert notification service server 704 may transmit data directly through network 602 to alert users at user/examinee 608 and user examinee 612. Alert notification service server 704 may contain fields for a specific user which determines the nature of the alerts sent while taking the test.

For example, alert notification service server 704 may include registration 706; in which a user registers to receive alerts, customization 708; an alert mechanism customized for a user based on an examination profile, a test profile, past performance of the user, and the like; activation 710 and deactivation 712; activation and deactivation turns the system on or off based on user preferences; and notification 714; which is the act of sending an alert notification based on user's preferences (for example, notification after every question, after every hour, after a predetermined period of time, etc.).

In addition, examination server may received input from examination timing database which may contain data as to how a specific user has performed in the past on examinations. Examination timing database may contain difficulty level data on questions previously seen by the user and associate the time taken by the user to answer these questions. With the use of examination timing database 722, this provides additional input into examination server 604 about the estimated time required for a particular question and therefore, the time in which to notify the user as to time left to answer a specific question while taking a test administered by a proctor located as examination server 604.

FIGS. 8A and 8B are exemplary examinee profiles for alerting an examinee while taking a test in accordance with the present invention. As shown in FIG. 8A, an examinee, such as examinee profile 626 in FIG. 6 and FIG. 7, may include a time parameter for a particular question. Additionally, if a user is attempting to answer the particular question and time spent on the question has exceeded a predetermined threshold, a notification alert message may be transmitted to the user to notify the user that a certain amount of time remains to answer the question and a typical amount of time in which the question has been answered in the past.

In this example, user 1 802, user 2 804 and user N 806 contain entries in an examinee profile. Each user 802, 804 and 806 has predetermined time periods in which to answer each question associated with each question. For example, in the case of user 1 802, question 1 has time t1 associated with question 1 question 2 has time t2 associated with question 2 and so on for each question on the test until question n is reached which may be the last question on the test. If a user, for example, user 1 802 exceeds a predetermined time in which to answer a question a notification alert message may be displayed indicating to the user the amount of time left to answer the specific question as well as a typical time to answer the question. The time period left to answer the specific question and the typical time to answer the question may be a standard time applied to all test takers or a customized time associated with a particular user.

In FIG. 8B, the examinee profile is shown for a question the examinee is currently working on, previous questions the examinee has attempted and answered and unattempted questions that remain in the test that have not been answered by the examinee. Current question examinee profile 808 may contain, for example, information such as the number of the question the examinee is currently attempting to answer, which in this example is Question 7; time taken so far by the examinee in attempting to answer the question, which in this example is 7 minutes and 7 seconds; the time allotted for the examinee to answer the question, which in this example is 11 minutes and 29 seconds; and when an alert will be sent to the examinee indicating to the examinee of an elapse of the allotted time for the current question, which in this example is 4 minutes and 22 seconds.

Previous question examinee profile 810 may contain information about questions on the present test that the examinee has answered and may indicate actual time taken in answering each question along with the projected time in answering each question. The projected time in previous question examinee profile 810 for answering each question may be based on the examinee's previous performance level on questions determined to be of similar difficulty as each question in previous question examinee profile 810.

Unattempted questions examinee profile 812 may contain information about projected times for answering each question which may also be based on the examinee s previous performance level on questions determined to be of similar difficulty as each question in unattempted question examinee profile 812.

Figure 9:
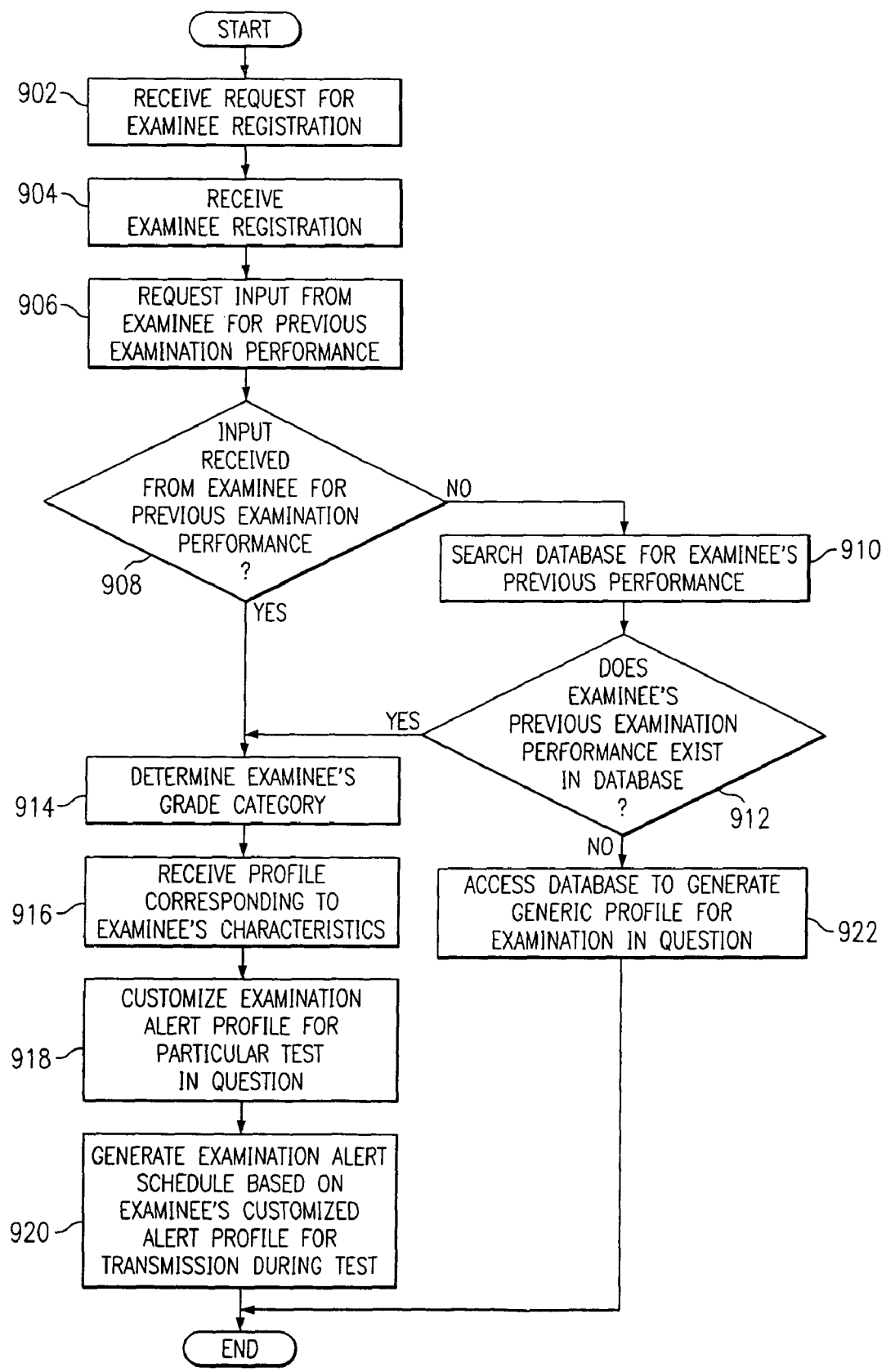
FIG. 9 is an exemplary flowchart illustrating establishing an examinee profile to customize a test notification alert in accordance with the present invention.

FIG. 9 is an exemplary flowchart illustrating establishing an examinee profile to customize a test notification alert in accordance with the present invention. As shown in FIG. 9, the operation beings by receiving a request for examinee registration (step 902). Registration of the examinee is then received (step 904). An input from the examinee from a previous examination performance is gathered from the examinee (step 906). A determination is then made as to whether or not input is received from the examinee for a previous examination performance (step 908). If input is not received from the examinee for a previous examination performance (step 908:NO), a database is searched for the examinee's previous performance (step 910).

Then a determination is made as to whether or not the examinee's previous performance exists in an examination performance database (step 912). If the examinee's previous performance does not exist in the examination performance database (step 912:NO), a database is accessed to generate a generic profile for the examination in question (step 922), and thereafter the operation terminates. If the examinee's previous performance does exist in the examination performance database (step 912:YES), the operation continues to step 914 in which the examinee's grade category is determined.

Returning to step 908, if input is received from the examinee for a previous examination performance (step 908:YES), the examinee's grade category is determined (step 914). The examinee's grade category may be determined by associating a difficulty level to each question the examinee has previously attempted and calculating a percentage of right answers obtained for each difficulty level. Alternatively, the examinee's grade category may be determined by averaging all previous tests taken by the examinee without regard to the difficulty level of each individual question.

A profile corresponding to the examinee's characteristics is then received (step 916). The examinee profile may be determined in a variety of ways. For example, the examinee profile may be determined depending on a degree of difficulty of questions on the test along with an examinee's past performance rating on previous tests. For example, suppose for questions with a degree of difficulty of 2 and for questions with a degree of difficulty of 3, the examinee's performance is 70 percent on answering questions of difficulty 2 and 3, the system may map the examinee's profile to a "C" or 70 percentile student.

The examinee profile contains information which attempts to associate the examinee's question answering capabilities with the degree of difficulty of the questions. For example, if the examinee is in a "C" or 70 percentile category, the test may be tailored to pose questions randomly selected in categories 2 to 3 out of a difficulty level represented by categories 1-5 with a category 1 question being the most difficult and a category 5 question being the easiest.

A examination alert profile is then customized for the registered examinee based on the test chosen for the examinee (step 918). An examination alert schedule is then generated for transmission to the examinee's workstation during the actual administration of the test based on the examinee's customized alert profile (step 920) and thereafter the operation terminates.

Figure 10:
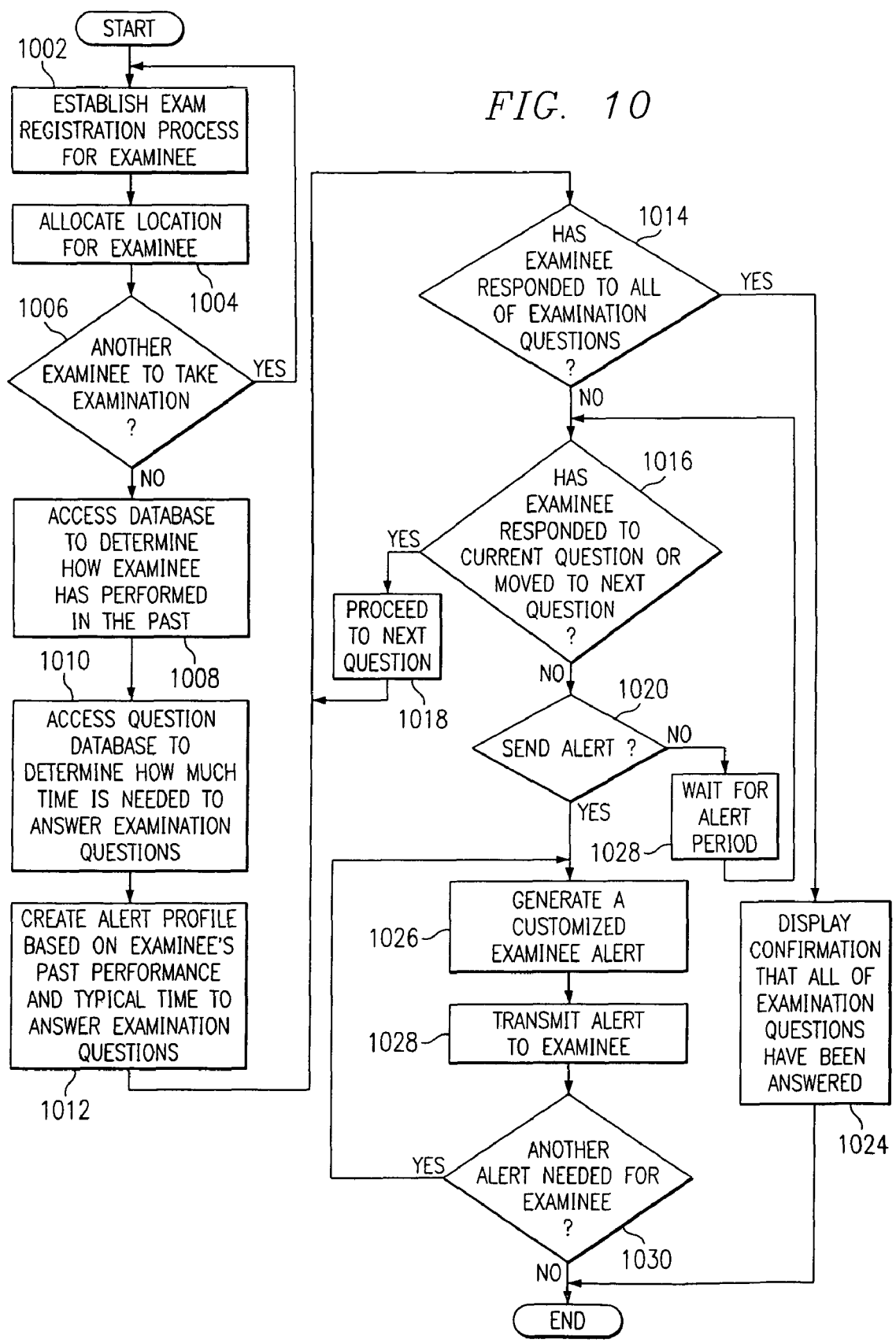
FIG. 10 is an exemplary flowchart illustrating a notification alert to an examinee while taking a test in accordance with the present invention.

FIG. 10 is an exemplary flowchart illustrating a notification alert to an examinee while taking a test in accordance with the present invention. As shown in FIG. 10, the operation begins by establishing an examination registration process for an examinee (step 1002). A location is then allocated for the examinee (step 1004). The location represents time and place where the examinee's test is scheduled.

A determination is then made as to whether or not another examinee has requested to take an examination (step 1006). If another examinee has requested to take an examination (step 1006:YES), the operation returns to step 1002 in which an examination registration process is established for the examinee. If another examinee has not requested to take an examination (step 1006:NO), a database is accessed to determine how the examinee has performed in the past (step 1008).

A question database is accessed to determine how much time is needed for this particular examinee to answer the questions included on the examination (step 1010). An alert profile is then created, as shown in FIG. 9, based on the examinee's past performance and typical time to answer the examination questions (step 1012).

A determination is then made as to whether or not the examinee has responded to all of the questions included in the examination (step 1014).

If the examinee has responded to all of the questions included in the examination (step 1014:YES), a confirmation is displayed indicating that all of the questions included in the examination have been answered by the examinee (step 1016), and thereafter the operation terminates. If the examinee has not responded to all of the questions included in the examination (step 1014:NO), a determination is then made as to whether or not the examinee has responded to the current question or moved to the next question (step 1016). If the examinee has responded to the current question or moved to the next question (step 1016:YES), the next question is displayed for an attempt by the examinee (step 1018) and the operation continues to step 1014 in which a determination is made as to whether or not the examinee has responded to all of the questions on the examination.

If the examinee has not responded to the current question or moved to the next question (step 1016:NO), a determination is made as to whether or not an alert should be sent to the examinee warning the examinee of the passage of the allotted time for answering the question (step 1020). If a determination is made as to not send the alert (step 1020:NO), the operation waits for a predetermined amount of time (step 1022) and thereafter returns to step 1016 in which the determination is made as to whether or not the examinee has responded to the current question or moved to the next question. If a determination is made as to send the alert (step 1020:YES), a customized examinee alert is generated (step 1026). The customized examinee alert is then transmitted to the examinee (step 1028). There may be no need for the examinee to respond to the alert, the alert may disappear after a predetermined period of time, if the question is answered or if the examinee moves on to the next question. The time period in which the alert is displayed is customizable by the user.

Next, a determination is then made as to whether or not another alert is needed for the examinee (step 1030). This additional alert may be a final alert or if the examinee takes additional time on a particular question, further alerts may be generated. Again, the display of additional alerts is based on the user's customization of the alert system. If another alert is not needed for the examinee (step 1030:NO), the operation terminates. If another alert is needed for the examinee (step 1030:YES), the operation returns to step 1026 in which a customized examinee alert is generated.

FIG. 11 is an exemplary flowchart illustrating generating a profile database for each question of a test in accordance with the present invention. As shown in FIG. 11, the operation begins by receiving an examination question from a test database (step 1102). The examination question is associated with an expected time in which to answer the examination question (step 1104). An examinee is then selected (step 1106). Time is measured for the selected examinee to answer the examination question based on the examinee's profile and the average time it takes to answer the question (step 1108). Steps 1104 through 1108 use response time for previous questions of similar degree of difficulty as questions on the current examination for an examinee performance profile.

Then, a determination is then made as to whether or not another examinee is to be selected (step 1110). If another examinee is to be selected (step 1110:YES), the operation returns to step 1106 in which an examinee is selected. If another examinee is not selected (step 1110:NO), then a determination is made as to whether or not another examination question is to be received (step 1112). If another examination question is to be received (step 1112:YES), the operation returns to step 1102 in which the examination question is received. If another examination question is not to be received (step 1112:NO), an examination question timing profile is updated for the examination question for the particular user (step 1114) and thereafter the operation terminates.

In addition to the above, if the embodiment is such that the client device is billed for use of the test administration service, a bill may be generated and transmitted to the client device. Moreover, a credit card account or other account type may be charged for providing the test administration service of the present invention.

If the embodiment is such that the test developer system operator is charged for use of the test administration service, information may be stored indicating the number of users to which a particular test was administered. This information may then be used to generate a bill to be paid by the test developer system operator.

Thus, the present invention provides a mechanism by which tests can be proctored from a remote location. Moreover, the present invention provides a mechanism for providing a test administration service by a third party who may bill for use of the test administration service.

The above embodiments assume that a proctor device monitors the progress of the test takers and is the one that determines whether a test taker is falling behind in completing the test. However, the present invention is not limited to such. Rather, the test administration system of the present invention may be provided with instructions for automatically monitoring timing data received from the client devices to determine if expected progress of the test taker is being achieved.

In such an embodiment, the timing data is analyzed as it is received from the client devices to determine if changes in the progress of the test taker are of a type that expected progress is not being achieved. For example, the time that elapsed since beginning the current question may be compared to previous questions to determine if a large change in this data is experienced. Such large changes may indicate that the test taker has spent too long on a particular question or the test taker is involved in an activity that is not consistent with taking an on-line test. This activity may be that the test taker is no longer seated at the testing terminal or that the test taker has given up on answering any more questions.

If it is determined from the analysis of the timing data that too long of a time has been used in attempting to answer a particular question, an alert may be generated on the proctor workstation and a window displaying the timing data may be automatically enabled so that the proctor device is made aware of the longer than expected response time. Other modifications to the embodiments described above will become apparent to those of ordinary skill in view of the above description and are intended to be within the spirit and scope of the present invention. The examination environment may be wireless, wherein the client devices, alert generation, and the like may be performed using wireless means.

Further, the monitoring of elapsed time since an unanswered question has been presented may be performed using other elements other than a proctor device. For example, the monitoring and generating of alerts may be implemented in a program on the device on which the test is being presented. The program may be for example an applet. The alerts may take various forms, such as audio and/or visual. Audio alerts may be for example a tone or wave file. The tone or frequency of the tone may be varied based on how much time has elapsed. The visual indicator may be an icon or bar, which may change or animate depending on the amount of time that has elaspsed since an unanswered question has been presented.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for monitoring responses to test questions presented in a data processing system, the method comprising the computer implemented steps of:
   identifying presentation of the test questions on the data processing system;
   responsive to the presentation of the test questions on the data processing system, monitoring test question timing data in which the test question timing data represents an elapsed time since an answered question from the test questions has been presented, wherein the elapsed time is an amount of time in attempting to answer a specific test question; and
   generating a customized user alert after the test question timing data exceeds an alert threshold while continuing to present the specific test question for the test taker to answer, wherein the customized user alert apprises a test taker that the elapsed time is excessive for the specific test question, wherein the customized user alert is periodically presented to the test taker based on an alert schedule for the specific test question after at least one time period indicated by the alert schedule, wherein the customized user alert includes an amount of time remaining to answer the specific test question, a suggested amount of time to spend on the specific test question, and an amount of time allotted to complete all of the test questions, wherein the alert schedule is generated for the test taker based on a customized alert profile for the test taker, wherein the suggested amount of time to spend on the specific test question is calculated for the test taker based on the customized alert profile, and wherein the customized alert profile includes previous performance information of the test taker, information to associate a level of difficulty of the specific test question with a capability category of the test taker to answer the specific test question, and at least one alert threshold for each of the test questions.

2. The computer-implemented method of claim 1, wherein the monitoring step is performed by a proctor device or a program on the data processing system.

3. The computer-implemented method of claim 1, wherein the presentation of the test questions is based on levels of difficulty of the test questions and the capability category of the test taker to answer the test questions.

4. The computer-implemented method of claim 1 further comprising:
   billing a client for monitoring the presentation of the test questions.

5. The computer-implemented method of claim 1, wherein the test questions are part of a test and further comprising:
   storing an identification of a number of test takers for the test; and
   billing a client based on the number of test takers for the test.

6. The computer-implemented method of claim 1, further comprising:
   billing a test developer for monitoring the presentation of the test questions.

7. The computer-implemented method of claim 1, further comprising:
   storing a score for the test questions in a permanent storage.

8. The computer-implemented method of claim 1, wherein the test questions are developed by a test developer system and wherein the method is implemented by a test administration system that is operated by a different entity from the test developer system.

9. The computer-implemented method of claim 1, wherein a session identification is established for the presentation of the test questions by a proctor device and includes a proctor device identifier, and wherein outputting the test question timing data to the proctor device is based on the proctor device identifier.

10. The computer-implemented method of claim 1, further comprising:
    storing a response to the specific test question from the test taker to update the customized alert profile for use in future tests.

11. The computer-implemented method of claim 1, further comprising:
    storing the test question timing data for the specific test question to update the customized alert profile for use in future tests.

12. A computer-implemented method for monitoring responses to test questions presented in a data processing system, the method comprising the steps of:
    administering, from an examination server, a plurality of tests to a plurality of remotely located users on a plurality of user devices and for each test of said plurality of tests that is administered:
        establishing a session identification for the administration of the test to the remotely located user, wherein said session identification includes a user identification, a test identifier, and a proctor device identifier;
    identifying presentation of the test questions on a user device of said user devices;
    responsive to the presentation of the test questions on said user device, monitoring test question timing data in which the test question timing data represents an elapsed time since an answered question from the test questions has been presented, wherein the elapsed time is an amount of time in attempting to answer a specific test question;
    correlating the test question timing data to the administration of the test to the remotely located user based on the session identification;
    wherein the test question timing data is output to said proctor device, based on said proctor device identifier, in response to determining that evidence of greater than expected response time to the specific test question is present; and
    generating a customized user alert message after the test question timing data exceeds an alert threshold while continuing to present the specific test question for the remotely located user to answer, wherein the customized user alert message apprises the remotely located user that the elapsed time is excessive for the specific test question, wherein the customized user alert message is periodically presented to the remotely located user based on an alert schedule for the specific test question after at least one time period indicated by the alert schedule, wherein the customized user alert message includes an amount of time remaining to answer the specific test question, a suggested amount of time to spend on the specific test question, and an amount of time allotted to complete all of the test questions, wherein the alert schedule is generated for the remotely located user based on a customized alert profile for the remotely located user, wherein the suggested amount of time to spend on the specific test question is calculated for the remotely located user based on the customized alert profile, and wherein the customized alert profile includes previous performance information of the remotely located user, information to associate a level of difficulty of the specific test question with a capability category of the remotely located user to answer the specific test question, and a plurality of alert thresholds for each of the test questions;

wherein the remotely located user can send instant messages to and receive instant messages from said proctor device associated with said examination server and wherein said proctor device can send instant messages to and receive instant messages from the plurality of remotely located users, and wherein instant messages are used to communicate and clarify test question wording details, test instructions, and the test question timing data for the remotely located user during the test.

* * * * *